United States Patent Office 2,905,729
Patented Sept. 22, 1959

2,905,729

CATALYST FOR PREPARATION OF DIARYL PARAFFINS

Edwin M. Smolin, Springdale, Conn., assignor to American Cyanamid Company, New York, N.Y., a corporation of Maine No Drawing. Application January 24, 1958
Serial No. 710,843

5 Claims. (Cl. 260—668)

This invention relates to a process of producing diaryl paraffins and, more particularly, to a process of producing 1,1-diarylethanes by the reaction of acetylene with a mono- or di-alkyl substituted benzene.

Paraffins having at least two carbon atoms and having two aryl substituents attached to one of said carbon atoms have been produced in the past by a number of different reactions employing a variety of catalysts. Thus, for example, a mono- or di-alkyl substituted benzene has been reacted with paraldehyde in the presence of hydrogen fluoride to form a 1,1-diarylethane. It has also been proposed to react acetylene with a mono- or di-alkyl substituted benzene in the presence of a sulfuric acid-mercuric sulfate catalyst for the production of 1,1-diarylethanes. Reilly et al., J. Am. Chem. Soc., vol. 50 (1928) pages 2565–2566. I have now found a novel catalyst which is effective for the reaction of acetylene with a mono- or di-alkyl substituted benzene for the production of 1,1-diarylethanes.

The diarylethanes produced in accordance with my invention are especially important in that they may be cracked to produce ring- or nuclear-substituted styrenes which may be polymerized to form synthetic resinous compositions useful in the production of plastic films, castings and molded objects.

It is an object of my invention to provide a novel catalyst for the production of paraffins having at least two carbon atoms and having two aryl substituents attached to one of said carbon atoms. It is a further object of my invention to prepare 1,1-diarylalkanes by the reaction of acetylene with a mono- or di-alkyl substituted benzene in the presence of a novel catalyst therefor. These and other objects of my invention will be discussed more fully hereinbelow.

I have now found that the reaction of acetylene with a mono- or di-alkyl substituted benzene for the production of 1,1-diarylethane may be carried out in the presence of a catalyst comprising selenium oxide, either in its anhydrous state ($SeO_2$) or the hydrate ($SeO_2 \cdot H_2O$) in combination with a strong acid. The strong acid which may be employed together with the selenium oxide in the process herein described may be any one of various acids which are available including mineral acids such as sulfuric, chlorosulfonic, fluorosulfonic, hydrochloric, hydrogen fluoride, hydroxyborofluoric, fluorophosphoric, phosphoric acid $H_3PO_4$, or other phosphoric acids, such as orthophosphoric, pyrophosphoric, triphosphoric, tetraphosphoric, and various alkane or aromatic sulfonic acids, such as methane sulfonic, ethane sulfonic, toluene sulfonic and the like, for example. The selenium dioxide may be dispersed or dissolved in the strong acid and then introduced into the reaction zone for the production of the diaryl substituted paraffins or alternatively the selenium oxide may be separately introduced into the reaction mixture containing the strong acid. Concentrated sulfuric acid is the preferred acid component. Other methods of introduction of the catalyst into the reaction mixture will be apparent to those skilled in the art. To minimize formation of side reactions, a highly concentrated acid is preferred. When sulfuric acid is employed, for example, concentrations of from about 85% to about 105%, preferably from about 88% to about 98.5% are employed in the instant process. The amount of acid that is used in the reaction may vary over rather wide limits, for example, from about one part of acid per part of substituted benzene charged to about one part of acid to about 25 parts of substituted benzene charged. However, it is preferred that from about 1:12 to about 1:3 parts of concentrated acid be employed per part of substituted benzene. The amount of the selenium oxide employed to form the acid-selenium oxide catalyst may range from about 0.5% to about 20% by weight, based on the weight of acid present. It is preferred that about 3% to about 10% by weight of selenium oxide be present, based on the total weight of acid present.

The following examples are given by way of illustration and not limitation in order that those skilled in the art may more fully understand the present inventive concept. All parts are parts by weight and should not be considered limitations unless so expressed in the appended claims.

*Example 1*

To 920 parts of toluene and 138 parts of 95.5% sulfuric acid maintained at 8–11° were added 4.5 parts of selenous acid ($SeO_2 \cdot H_2O$). Gaseous acetylene was bubbled in at the rate of 0.03 mole per minute for 70 minutes. The liquid phases present were then separated and the organic layer was washed with aqueous NaOH solution and distilled. A yield of 45% of 1,1-ditolylethane based on toluene used up is obtained.

*Example 2*

The procedure of Example 1 is repeated with the exception that after 40 minutes an additional 2.0 parts of $SeO_2 \cdot H_2O$ and 25 moles of 96% $H_2SO_4$ were added and the reaction continued for a total of 70 minutes. A yield of 1,1-ditolylethane, based on toluene used up, of 48% is obtained.

*Example 3*

The procedure of Example 1 is repeated with the exception that the selenious acid was omitted. No ditolylethane was isolated. A considerable portion of the toluene was converted to toluene sulfonic acid.

*Example 4*

To a mixture of 920 parts of xylene and a catalyst solution consisting of 10 parts of selenous acid ($SeO_2 \cdot H_2O$) and 730 parts of phosphoric acid is added 52 parts of acetylene over a period of 120 minutes with vigorous agitation at a temperature maintained at 95° C.–115° C. At the end of this time, the organic layer is washed with 20% KOH, dried and distilled. There is obtained a yield of 42% 1,1-dixylylethane based on xylene used up.

The theoretical stoichiometric ratio of the present reaction requires that two mols of the mono- or di-alkyl substituted benzene react with each mole of acetylene for the formation of the diaryl substituted paraffin. In order to obtain optimum yields of the diaryl substituted paraffin, it is preferred, however, that from about 15% to about 45% of the stoichiometric amount of acetylene theoretically required to react with all of the substituted benzene be employed herein. The concept of limiting stoichiometric amounts is more fully described and claimed in U.S. Patent 2,734,928. The limitation to between 15% and 45% of acetylene that is introduced into the reaction mixture substantially minimizes the occurrence of side reactions.

Examples of mono- and di-alkyl substituted benzenes that may be utilized in the process of my invention are such as toluene, o-, m- and p-xylenes, ethylbenzene and the like. Longer chain mono- and di-alkyl substituted benzenes such as butylbenzene may also be employed in the process of my invention.

A convenient method of carrying out the present reaction of my invention is to charge the desired amount of substituted benzene into a suitable reaction vessel which is then cooled to about 5° C. below the desired reaction temperature. Stirring of the substituted benzene is then begun and the sulfuric acid catalyst then introduced therein. As previously stated, the strong acid may contain the selenium oxide or the selenium oxide may be separately introduced into the mixture preferably, as a matter of convenience, in its hydrate form. The reaction may be carried out at temperatures ranging from about —20° C. to about 200° C. Stirring of the mixture is maintained throughout the reaction to emulsify the acid and the hydrocarbons and to promote substantially complete circulation of catalyst in the reactor. When temperatures in excess of about 45° C. are employed, it is preferred that an acid such as phosphoric be utilized rather than sulfuric acid or if sulfuric acid is employed that its concentration be lowered somewhat, i.e. to about 85% due to the sulfonation effect of more concentrated sulfuric acid when employed at higher temperatures. The desired calculated amount of acetylene is introduced into the reactor at a suitable rate. After the acetylene addition is complete, stirring of the reaction mixture is discontinued, the reaction mixture is separated into two layers, the organic layer washed with an aqueous caustic solution and the 1,1-diarylethane recovered therefrom by distillation. When temperatures approaching the boiling point of the aromatic hydrocarbon are utilized, it is more advantageous to conduct the reaction in a closed vessel under moderate pressures, i.e. in excess of one atmosphere and up to about 10 atmospheres. When the reaction is carried out at below 0° C., the reaction mixture is more difficult to work up and the separation of the acid layer from the desired product is slower. Therefore, it is preferred that a temperature range of from about 0° C. to about 45° C. be employed in the process.

The process of my invention may be carried out as a batch, semicontinuous or as a single or multistage continuous operation. Inasmuch as a semicontinuous or batch operation inherently entails an increased number of manual procedural steps and a single stage continuous reaction produces lower yields, it is desirable to carry out the reaction in a multistage continuous reactor. In the multistage continuous reaction, the aromatic compound is passed through a series of reactors in which the aromatic compound is contacted with the catalyst, the latter may be either a liquid alone or mixed with the strong acid or as solid selenium dioxide. It is preferred that the selenium oxide be introduced with the strong acid as a continuous stream to each of the stages of the reactant which are provided with suitable mixing means. The resultant product is separated into a hydrocarbon layer and a catalyst layer and the latter is returned for further use in the process while the hydrocarbon layer is washed, dried and distilled to provide the diaryl alkane product.

I claim:
1. In the preparation of a 1,1-diarylethane wherein acetylene is reacted with a member selected from the group consisting of mono- and di-alkyl substituted benzene, the improvement which comprises carrying out the reaction in the presence of a strong acid-selenium oxide catalyst, wherein the ratio in parts by weight of said acid to said substituted benzene is from about 1:1 to about 1:25, respectively.

2. The method of claim 2 wherein the catalyst is sulfuric acid-selenium dioxide.

3. In the preparation of 1,1-ditolylethane wherein acetylene is reacted with toluene, the improvement which comprises carrying out the reaction in the presence of a sulfuric acid-selenium dioxide catalyst, wherein the ratio in parts by weight of said acid to said substituted benzene is from about 1:1 to about 1:25, respectively.

4. In the preparation of 1,1-dixylylethane wherein acetylene is reacted with xylene, the improvement which comprises carrying out the reaction in the presence of a sulfuric acid-selenium dioxide catalyst, wherein the ratio in parts by weight of said acid to said substituted benzene is from about 1:1 to about 1:25, respectively.

5. In the preparation of 1,1-diarylethane wherein acetylene is reacted with a member selected from the group consisting of mono- and di-alkyl substituted benzene, the improvement which comprises carrying out the reaction in the presence of phosphoric acid-selenium dioxide catalyst, wherein the ratio in parts by weight of said acid to said substituted benzene is from about 1:1 to about 1:25, respectively.

References Cited in the file of this patent

UNITED STATES PATENTS

| | | |
|---|---|---|
| 2,161,066 | La Lande | June 6, 1939 |
| 2,366,724 | Gardner | Jan. 9, 1945 |
| 2,648,638 | Richter | Aug. 11, 1953 |
| 2,734,928 | Smolin | Feb. 14, 1956 |
| 2,773,914 | Prill | Dec. 11, 1956 |
| 2,802,038 | Prill | Aug. 6, 1957 |